(12) United States Patent
Gölling et al.

(10) Patent No.: US 9,014,877 B2
(45) Date of Patent: Apr. 21, 2015

(54) AIRCRAFT WITH A CONTROL DEVICE

(75) Inventors: Burkhard Gölling, Buchholz i.d.N (DE); Frank Haucke, Berlin (DE); Matthias Bauer, Berlin (DE); Wolfgang Nitsche, Gollenberg (DE); Inken Peltzer, Berlin (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/525,282

(22) Filed: Jun. 16, 2012

(65) Prior Publication Data
US 2013/0035808 A1 Feb. 7, 2013

Related U.S. Application Data

(63) Continuation of application No. PCT/EP2010/007923, filed on Dec. 23, 2010.

(60) Provisional application No. 61/289,488, filed on Dec. 23, 2009.

(30) Foreign Application Priority Data

Dec. 23, 2009 (DE) .......................... 10 2009 060 327

(51) Int. Cl.
*B64C 15/00* (2006.01)
*B64C 29/00* (2006.01)
*B64C 23/00* (2006.01)

(52) U.S. Cl.
CPC ........... *B64C 23/005* (2013.01); *B64C 29/0025* (2013.01)

(58) Field of Classification Search
CPC .................... B64C 23/005; B64C 2700/6271; B64C 2700/6274; B64C 29/0025; B64C 21/04; B64C 9/38; B64C 23/00; B64C 21/025; B64C 27/18; B64C 27/325; B64C 27/54; B64C 2700/6284; B64C 27/605; B64C 27/72; Y02T 50/166; Y02T 50/34; B63H 1/28; G01C 23/00; G01C 23/005; G08G 5/0021; G08G 2/0052; G08G 5/0013

USPC .......... 701/3; 244/213, 203, 195, 76 R, 42, 5, 244/4 R, 7 C, 17.13, 12.1, 15, 17.25, 23 D, 244/23 A, 20, 207, 208; 416/20 R, 114
See application file for complete search history.

(56) References Cited

U.S. PATENT DOCUMENTS 2,464,651 A * 3/1949 Peeker .......................... 416/20 R
3,022,026 A * 2/1962 Shaw ........................... 244/23 R
(Continued)

FOREIGN PATENT DOCUMENTS

DE 10 2006 053 259 5/2008
DE 102007024371 A1 11/2008
(Continued)

OTHER PUBLICATIONS

International Search Report for Application Serial No. WO 2011/076427 dated Sep. 5, 2011.
(Continued)

*Primary Examiner* — John Q Nguyen
*Assistant Examiner* — James E Stroud
(74) *Attorney, Agent, or Firm* — Jenkins, Wilson, Taylor & Hunt, P.A.

(57) ABSTRACT

An aircraft with aerofoils including a main wing and a control flap that includes an adjustment flap. The aircraft includes an actuator for the control flap, as well as a sensor device for acquiring the position of the control flap, an arrangement of flow-influencing devices for influencing the fluid that flows over a segment of the main wing, and flow-state sensor devices for measuring the flow state. The aircraft includes a flight control device connected to the sensor device for acquiring the position of the control flap and to the flow-state sensor devices, and connected to the actuator and flow-influencing devices for transmitting actuating commands, and a flight-state sensor device connected to the flight control device for transmitting flight states. The flight control device includes a function that selects the flow-influencing devices that are operated for optimizing local lift coefficients on the aerofoil, depending on the flight state.

8 Claims, 4 Drawing Sheets

(56) References Cited

U.S. PATENT DOCUMENTS

| | | | |
|---|---|---|---|
| 3,300,978 A * | 1/1967 | Pennington | 60/231 |
| 3,785,593 A * | 1/1974 | Von Ohain et al. | 244/12.1 |
| 3,830,450 A * | 8/1974 | Williams et al. | 244/207 |
| 3,887,146 A * | 6/1975 | Bright | 244/12.1 |
| 4,802,642 A | 2/1989 | Mangiarotty | |
| 4,932,610 A | 6/1990 | Maestrello | |
| 5,601,047 A * | 2/1997 | Shen | 114/274 |
| 5,727,381 A * | 3/1998 | Rogers | 60/231 |
| 6,109,566 A * | 8/2000 | Miller et al. | 244/207 |
| 6,390,417 B1 | 5/2002 | Yoshino | |
| 6,390,418 B1 * | 5/2002 | McCormick et al. | 244/207 |
| 6,394,396 B2 * | 5/2002 | Gleine et al. | 244/198 |
| 6,394,696 B1 * | 5/2002 | Culver | 404/75 |
| 7,290,738 B1 * | 11/2007 | Rogers et al. | 244/207 |
| 7,367,530 B2 * | 5/2008 | Harrigan et al. | 244/184 |
| 7,861,977 B1 * | 1/2011 | Krol et al. | 244/207 |
| 8,382,044 B2 * | 2/2013 | Holzhausen | 244/213 |
| 8,561,935 B2 * | 10/2013 | Milde, Jr. | 244/9 |
| 2007/0034746 A1 * | 2/2007 | Shmilovich et al. | 244/207 |
| 2007/0051855 A1 * | 3/2007 | Shmilovich et al. | 244/207 |
| 2009/0292405 A1 | 11/2009 | Najmabadi et al. | |

FOREIGN PATENT DOCUMENTS

| | | |
|---|---|---|
| DE | 10 2009 057 405 A1 | 6/2011 |
| WO | WO 2008/141622 A2 | 11/2008 |

OTHER PUBLICATIONS

German Office Action for Application Serial No. 10 2009 060 327.1 dated Sep. 25, 2013.

Chinese Office Action for Application Serial No. 2010 800 648 61.6 dated Jul. 23, 2014.

\* cited by examiner

AIRCRAFT WITH A CONTROL DEVICE

CROSS-REFERENCE TO RELATED APPLICATIONS

The present application is a continuation of International Application No. PCT/EP2010/007923, filed on Dec. 23, 2010, which claims priority from German Application DE 10 2009 060 327.1, filed on Dec. 23, 2009, and claims the benefit of U.S. Provisional application 61/289,488, filed on Dec. 23, 2009, each of which is hereby incorporated in its entirety by reference.

FIELD OF THE INVENTION

The invention relates to an aircraft with a control device.

BACKGROUND

From the general state of the art, flow-influencing devices that are integrated in the aerofoils of an aircraft are known, by means of which flow-influencing devices specified local aerodynamic flow states on segments of the aerofoil are to be stabilised. In this arrangement it can, in particular, be provided for a reduction of turbulence on the aerofoil so as to prevent, in critical flight states, the local lift coefficient from being reduced as a result of the formation of local turbulent flow. Such flow-influencing devices can be implemented as:
- passive vortex generators,
- devices that provide continuous blowing-out in regions where there is a danger of separation,
- devices by means of which suction removal of the flow that has a tendency to separate is achieved.

SUMMARY

Various embodiments of the invention provide measures by means of which the aerodynamic performance of controlled aircraft can be improved.

According to various embodiments of the invention an aircraft is provided whose aerofoil includes a main wing and at least one adjustable flap that is arranged so as to be adjustable relative to the aforesaid. The adjustable flap can be a control flap. As an alternative or in addition the adjustable flap can be a high-lift flap. The aircraft includes:
- an actuator for operating the at least one adjustable flap or control flap, as well as a sensor device for acquiring the set position of the adjustable flap,
- at least one arrangement of flow-influencing devices, which extends in at least one surface segment of the main wing, which surface segment extends in the direction of the wingspan, and/or of at least one control flap of each aerofoil, for the purpose of influencing the fluid that flows over the surface segment,
- at least one arrangement of influencing flow-state sensor devices for measuring the flow state at the respective segment,
- a flight control device which on the input side is functionally connected to the sensor device for acquiring the set position of the adjustable flap or control flap and to the flow-state sensor devices, which flight control device for the purpose of transmitting actuating commands on the output side is functionally connected to the actuator and the flow-influencing devices,
- a flight-state sensor device for acquiring flight states of the aircraft, wherein the flight-state sensor device is functionally connected to the flight control device for transmitting flight states, and
- a specifying device for generating desired commands, which correspond to flight states of the aircraft, the specifying device being functionally connected to the flight control device for transmitting the commands as input signals of the flight control device.

The flight control device in particular includes a function that for the purpose of optimizing local lift coefficients on the aerofoil depending on the respective acquired flight state carries out a selection of the flow-influencing devices that are to be operated. The flight control device can in particular be designed in such a manner that it generates actuating commands for commanding the actuator and the flow-influencing devices and transmits them to the aforesaid, wherein the flight control device determines the then current actuating commands on the basis of the desired commands of the specifying device, the sensor signals of the flight-state sensor device and the sensor signals of the flow-state sensor device. The flight control device can, in particular, include a function that for the purpose of optimizing local lift coefficients on the main wing depending on the flight state carries out a selection of the flow-influencing devices that are to be operated.

In this arrangement it can, in particular, be provided for the regulating device to determine the desired flow-state values segment by segment as local desired flow-state values in order to in each case control an arrangement of flow-influencing devices in each case in a surface segment of each wing or of a flap for influencing the fluid flowing over the surface segment, which surface segment extends in the direction of the wingspan or flap span.

The adjustable flap, which is operated by the actuator controlled by the flight control device, can, in particular, be a control flap of the aircraft. As an alternative or in addition, the adjustable flap can also be an adjustment flap. In this context the term "adjustment flap" refers to an adjustable flap that adjusts or sets an operating state or a flight state and in so doing is not, or is not primarily, used for controlling the aircraft. Thus the actuator movement of the control flap continuously moves during control of the aircraft, while the adjustment flap does not move during a flight phase or part of a flight phase, e.g. during takeoff or landing. The adjustment flap can, in particular, be a high-lift flap such as a leading edge flap or a trailing edge flap. Furthermore, the flap that according to various embodiments of the invention is controlled by the flight control device can be a flap that has both the function of an adjustment flap and the function of a control flap.

The flight control device is, in particular, designed in such a manner that, for the purpose of controlling the aircraft, apart from generating actuating commands for commanding the actuator of the adjustable flap also generates actuating commands for controlling and operating the flow-influencing devices and transmits them to the aforesaid. Controlling or commanding the flow-influencing devices is thus functionally integrated in generating actuating commands for commanding the actuator of the at least one adjustable flap or control flap, and the correspondingly generated control commands for operating the flow-influencing devices and the actuator of the at least one adjustable flap or control flap are functionally in a mutual relationship of dependence. In this arrangement the flight control device determines the then current actuating commands for controlling or commanding the actuator and actuating commands for controlling or commanding the flow-influencing devices on the basis of the desired commands of the specifying device, the sensor signals of the flight-state sensor device and the sensor signals of the flow-state sensor device. The specifying device can, in particular, be a control-specifying device for operating adjustable flaps and in particular of control flaps for controlling the aircraft and/or for setting adjustment flaps according to various embodiments of the invention. In other words, during operation of the control flaps and/or of adjustment flaps the flight control device additionally carries out optimization of current actual local lift coefficients by influencing the flow on the surface of the aerofoil and/or of the adjustable flap depending on the flight state and the control command by determining of a selection of respectively to be commanded flow-influencing devices.

In this arrangement the flight control device can, in particular, include a control or regulating algorithm that corrects the aforesaid input values according to the received desired commands (complete control). The regulating algorithm of the flight control device can on the one hand include the synthesis of a value for lift, drag or lift-to-drag ratio from sensor data, in particular from sensor devices that in each case are locally associated with flow-influencing devices, on the aerofoil or the flap, and on the other hand can include a robust regulating algorithm for attaining a specified target value for the above value. The regulator is preferably supported by an anti-wind-up reset structure.

Selection of the flow-influencing devices to be activated at a given time, and determination of the intensity at which the flow-influencing devices are activated at a given point in time can, in particular, be arrived at from a combination of temporal integration and a reference table, and can one-to-one be associated with a flight-relevant quantity, for example a key characteristic relating to the lift that in each case is locally associated with the flow-influencing devices. In this arrangement, in particular, a local lift parameter related to at least one or each segment on the flow surface of the aerofoil or of an adjustable flap can be determined in which a plural number of flow-influencing devices are arranged. In this manner, for operating the flow influencing devices, it is indirectly possible to specify for example the lift or lift coefficient, which specification is subsequently by means of the algorithm converted to a specification relating to the numerical value. It can be further provided for the local lift characteristic to be used to determine the deviation of the respective local lift characteristic from a then current characteristic determined by an associated sensor device, by means of which a determination is made as to whether the respective flow-influencing device is activated, and if so at what intensity.

The controller or regulator can have been designed on the basis of a linear multivariable black-box model with a method for synthesising robust regulators. During identification of the linear multivariable black-box model, suitable interference signals in the form of sudden changes in the extent of actuation are generated, and the reaction of the numerical measure to the aforesaid is measured. From the dynamic behaviour of the reaction a linear differential calibration system is obtained by means of parameter identification methods, which differential calibration system represents the basis of the regulator synthesis. Many different instances of such identification provide a model family from which in each case for each synthesis a representative or average model is selected. In regulator synthesis it is possible to use particular methods (e.g. $H_\infty$-synthesis, robustification, robust loop shaping). The arising classically-linear control circuit can be supported by an anti-wind-up reset structure which when there is a demand for a controller variable that is above the achievable controller variable corrects the internal states of the regulator in such a manner that an integration component in the regulator does not result in overshooting or locking of the regulator. Thus even in the case of unrealistic requirements the regulator remains responsive, which increases operational safety. The regulator is always adjusted to the then current situation, without experiencing delays caused by previous limitations of the controller variable.

The regulator can, in particular, be designed as an optimum regulator that receives all the necessary input variables as regulating variables, and according to a regulating method algorithm in a matrix-like process generates the various output signals for the flow-influencing device and/or the actuator or flap drive of the at least one controlled adjustable flap, on the basis of calibrations and parameters derived therefrom for the allocation of regulating variables and controller variables depending on flight state variables.

According to an example embodiment of the invention, the regulator is functionally designed in such a manner that by means of an integrated regulator function and in particular in an operational interval or iteration step said regulator determines a control signal vector that includes on the one hand control signals for the at least one actuator of the adjustable flap, and in particular of the at least one control flap, and on the other hand control signals for flow-influencing devices. The control signals for flow-influencing devices also include a determination as to whether control signals for some or for all flow-influencing devices are to be provided at all, i.e. as to which flow-influencing devices are to be controlled in a given case.

According to an embodiment of the invention it can be provided for the flight control device to be designed in such a manner that by means of a model for the aircraft, which can be a filter or controller, it generates current control signals or a current control-signal vector with controller variables for commanding the actuator of the at least one control flap and of the flow-influencing devices and transmits said control signal vector to the aforesaid, wherein the flight control device determines the then current control signals or the current input signal vector on the basis of the desired commands of the specifying device, the sensor signals of the flight-state sensor device and the sensor signals of the flow-state sensor device.

As a result of the invention, systemic limitations relating to the maximum movement of the trailing edge device are taken into account, taking into account loads, maintenance requirements and costs, and in so doing the aerodynamic performance of a high-lift system is improved. Furthermore, in a more curved profile, separation of the flow at the top of the adjustment flap is prevented. Moreover, various embodiments of the invention meet the very stringent requirements relating to the precise setting of an adjustment flap relative to the main wing relating to weight and an efficient integration in the overall system, and consequently an overall high-lift system can be optimized both in terms of weight and cost.

According to various embodiments of the invention, the adjustment flap can thus, in particular, be a high-lift flap arranged on the aerofoil of the aircraft, wherein the arrangement (15) of flow-influencing devices and of flow-state sensor devices is arranged on the high-lift flap and/or on the main wing.

Furthermore, the flight-relevant characteristic provided in each case in relation to the flow-influencing devices can, for example, correspond to a local lift coefficient, a local drag, a local lift-to-drag ratio, and can be determined in a non-stationary manner from substitute regulating variables so that this characteristic is then used for a desired value comparison, and so as to finally in this manner set principally any value, within the framework of physics, from which value the control signals for the local flow-influencing devices are determined by means of linear, robust regulating algorithms designed for a linear model.

In this arrangement, as a result of doing away with heavy movable components, the regulating system is significantly faster when compared to systems based on conventional mechanical solutions so that local flow phenomena can be suppressed or used in a targeted manner.

In this arrangement the function for determining the selection of the flow-influencing devices that are to be activated can be a filter function or can be based on a filter function. In particular, in this arrangement it can be provided for those flow-influencing devices whose respectively associated sensor devices produce measuring signals that are within a permissible range not to be activated, in other words are allocated control signals with a value of zero. In particular, in this arrangement it can be provided for the local flow speed or the local pressure to exceed a minimum value. In contrast to this, control signals for these flow-influencing devices are determined with a value for their activation, whose respectively associated sensor devices produce measuring signals that are outside a permissible range, which range can, in particular, be defined in such a manner that its limit forms the transition to instances of local flow separation.

These flow control measures individually are measures that are suitable per se to partly or fully prevent separation on the flap in relation to a defined region. However, they only represent individual sub-systemic solutions because they are designed only for a specific configuration.

As a result of an excitation system that is cascaded in the direction of profile depth and that is controlled in a segmented manner, various flow situations where there is a danger of separation, caused by different configurations, can be prevented more efficiently. Periodic or pulsed blowing-out of compressed air through slits or similarly designed topologies on the trailing edge flaps has already proven to be very effective and, in the context of the configurations investigated, has also been very much more efficient (by a factor of 2 to 4) in relation to the air mass flow used when compared to continuous blowing-out. Since the flow conditions in the region of the flap vary as the flap positions vary, it is also possible for different separation states with different separation positions to occur at the trailing edge flap.

However, an actuator system with a determined excitation position is only optimized in relation to a particular range so that in the off-design case the effectiveness of the active flow control is reduced, and the energy requirement can increase excessively.

Periodic or pulsed blowing-out through slits or similarly designed topologies at the trailing edge flap with segmented and cascade-like arranged slits or similarly designed topologies can therefore prove to be particularly efficient because the respective flow states can be better controlled, and as a result of the pulsed nozzle flow the energy input takes place in a targeted and efficiently distributed manner into the flap flow that has separated or that is in the process of separating. If, moreover, regulation of the lift coefficient is used as an example target parameter, the effect can be controlled autonomously and designed efficiently.

Initial experimental results on two-dimensional profiles show that a cascade-like arrangement of the excitation system can efficiently cause the flow that tends towards separation to reattach. Investigations on industrial wind tunnel models have already proven the effect of this flow control technique on the basis of model actuators.

A necessary number of suitable sensors, for example pressure sensors, are integrated, in profile depth direction and in wingspan direction, in the trailing edge for the purpose of detecting the then current local flow state. The measuring data obtained in this manner and the target value, specified by the pilot, of a particular parameter, for example of the lift coefficient, the sink rate and/or the climb rate, are used as input values for a correspondingly designed regulating loop. The parameters of frequency, pulse width, pulse entry into the flow, and/or the phase offset between the excitation positions can be used as controller variables for the actuator system. Depending on the then current flow case, the excitation positions can be operated separately or jointly. Segmented pulsed compressed-air actuators are particularly suitable as an excitation mechanism, because they have already proven themselves in numerous experiments. However, in principle, other actuators, for example synthetic jet actuators or mechanically, electrically and/or pneumatically driven actuators, can also be used for the application described herein, provided they include a corresponding function and performance, and furthermore meet the requirements for integration in a control circuit for dynamic control/regulation.

According to a further aspect of various embodiments of the invention, it can be provided for the flight control device to include a flight-state controlling device or flight-state regulating device and a flow-state controlling device or flow-state regulating device, wherein:

the flight-state controlling device is designed in such a manner that on the basis of the desired commands of the specifying device, the sensor signals of the flight-state sensor device and on the basis of sensor signals of the flow-state sensor device it generates desired commands to the actuator of the control flap and of desired flow-state values to the flow-influencing devices, and the flow-state controlling device is functionally connected to the flight-state controlling device for receiving the desired flow-state values for commanding the flow-influencing devices, and is designed in such a manner that the flow-state controlling device, on the basis of the desired flow-state values and on the basis of the sensor signals of the flow-state sensor device of the flow-influencing devices, transmits flow-state actuating commands to the flow-influencing devices.

The desired flow-state values can, in particular, be the local lift coefficients or the ratios of drag coefficient to lift coefficient in that segment.

Furthermore, the flight control device can include a control function that receives as input signals the actuating commands to the actuator of the control flap, and the flow-state actuating commands to the flow-influencing devices, on the basis of a correlation function co-ordinates these, and generates actuating commands for actuating the actuator of the control flap and of the flow-influencing devices, and transmits them to the aforesaid. In this arrangement the control function can be carried out in such a manner that optimisation of the actuating commands to the flow-influencing device and of the actuating commands to the actuator of the control flap takes place, taking into account the output available at the then current time and/or the dynamics of the flow-influencing device and/or of the actuator of the control flap.

According to various embodiments of the invention the flow-influencing device of a main wing or of the adjustment flap can include a pressure chamber, arranged in the main wing and/or in the adjustment flap, for receiving compressed air; an outlet chamber with outlet openings; one or several connecting lines for connecting the pressure chamber to the outlet chamber; at least one valve device integrated in the connecting line, which valve device functionally communicates with the flight control device, wherein the flight control device controls the valve device by means of the then current control signal vector in order to let compressed air present in the pressure chamber either not flow or flow at a corresponding speed and/or throughput through the outlet openings according to the actuating values of the then current control signal vector in order to influence the flow around the surface of the main wing or of the adjustment flap.

According to various embodiments of the invention the flow-influencing specifying device can include a control input device by means of whose activation the desired commands are generated, or can include an autopilot device which on the basis of a specified operating mode generates the desired commands, e.g. for controlling the path of the aircraft on a specified desired path.

In this arrangement the aircraft according to an embodiment of the invention can be designed in such a manner that the flight control device is designed as a flight-state regulating device or that it includes such a flight-state regulating device as well as a flow-state regulating device. The flight-state regulating device is designed in such a manner that, on the basis of the desired commands of the flow-influencing specifying device and the sensor signals of the flight-state sensor device, it transmits input signals to the flow-state regulating device that is functionally connected to the flight control device. Furthermore, in this arrangement the flow-state regulating device can be designed in such a manner that, on the basis of the input signals of the flight-state regulating device and on the basis of the sensor signals of the flow-state sensor device of each segment, it generates flow-state actuating commands for controlling the flow-influencing device of each segment and transmits them to the flow-influencing device of each segment in order to control the aircraft according to the desired commands of the flow-influencing specifying device.

In this arrangement it can be provided for the flight-state regulating device to include a segment control function that is designed in such a manner that it generates actuating commands to the flow-influencing device of each segment and/or the actuating commands to the actuator on the basis of the control signals of the flight-state regulating device by optimisation, taking into account the output and/or dynamics, available at the then current point in time, of the flow-influencing device and/or of the actuator of the adjustable flap.

According to various embodiments of the invention it can be provided for the arrangement of flow-influencing devices to include blow-out openings that are arranged in one segment or in several segments, and to include a flow generating device, arranged in the wing, for blowing out and/or removing by suction, by means of which flow generating device fluid is blown out of, or removed by suction from, the blow-out openings in order to influence the lift coefficient that locally occurs at the segment.

It can further be provided for the arrangement of flow influencing devices to additionally include suction openings that are arranged in one segment or several segments, and to include a suction device that is arranged in the wing and is in fluidic connection with the suction openings, through which suction device fluid from the suction openings is sucked in, in order to influence the lift coefficient that locally occurs at the segment.

Flow control can take place by means of blowing-out pulsed compressed air across the span at a defined profile depth position of the adjustment flap or of the trailing edge flap. The valve device or switching unit provided according to one embodiment of the invention can be operated at variable frequency, variable duty cycle (ratio of time with through-flowing air to the duration of a pulse) and air mass flow so that a (periodically) pulsed airflow with a variable pulse is generated. By means of a pressure chamber or an actuator chamber the desired outlet speed distribution can be generated at the place of excitation.

On the basis of the load conditions and safety conditions relating to weight limits in the takeoff and landing phases, technical boundaries for the design of such a trailing edge flap without and with a lowered spoiler and extended trailing edge flap are significantly expanded.

According to various embodiments of the invention, the at least one segment can include several segments that are arranged one behind the other when viewed in the wingspan direction of the wing.

The specifying device for generating desired commands that correspond to flight states of the aircraft as input signals of the flight control device can be a control input device for controlling the aircraft, and the input signals can be variables relating to the climbing rates or sinking rates or to acceleration. The specifying device can include a control input device by means of whose activation the desired commands are generated. Furthermore, the specifying device can include an autopilot device, which, on the basis of a specified operating mode generates the desired commands, e.g. for controlling the path of the aircraft on a specified desired track.

The arrangement of flow-influencing devices can also be designed so as to be switchable by the pilot.

BRIEF DESCRIPTION OF THE DRAWINGS

Below, the invention is described with reference to the enclosed figures which show the following.

In the figures, components and functions with an identical or similar function have the same reference characters.

DESCRIPTION

Figure 1:
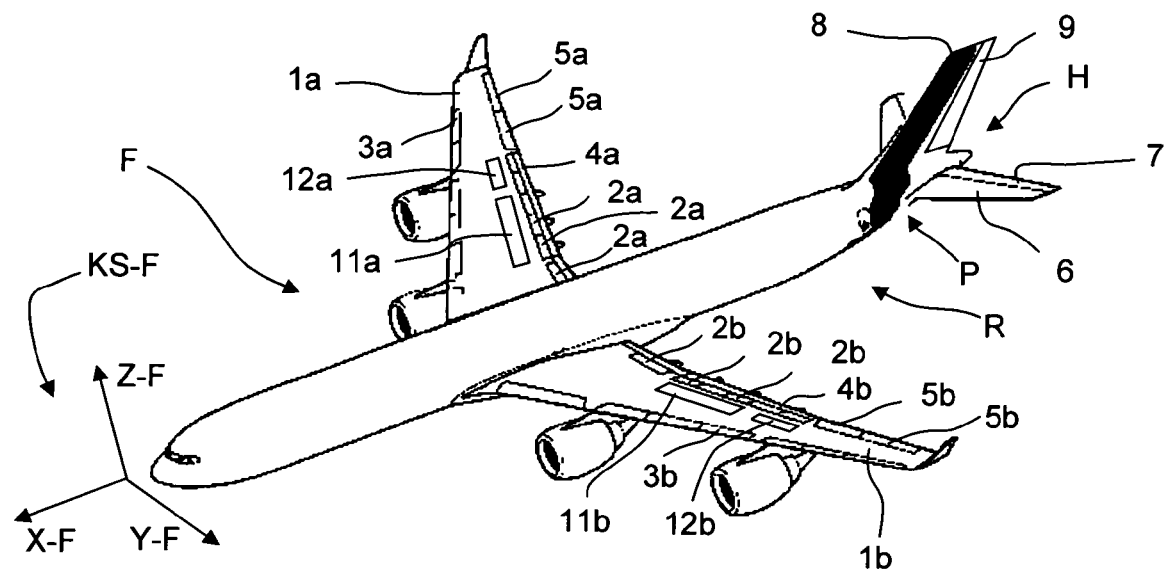
FIG. 1 a perspective view of an aircraft in which the flow-influencing device provided according to an embodiment of the invention is integrated.

The example embodiment, shown as an example in FIG. 1, of a controlled aircraft F to which the invention can be applied, according to the commonly-used shape includes two aerofoils 1a, 1b, each including at least one aileron 5a or 5b. Furthermore, the aircraft shown in FIG. 1 on each aerofoil 1a, 1b includes three leading-edge lift bodies 3a, 3b and three trailing-edge lift bodies 4a, 4b as high-lift flaps. Optionally, the aerofoils 1a, 1b can each include a plural number of spoilers 2a, 2b. Furthermore, the aircraft F includes a tail unit H with a vertical stabiliser 8 with a rudder 9 and a horizontal tail 6, in each case with at least one elevator control surface 7. The horizontal tail 6 can, for example, be designed as a T-tail, as shown in FIG. 1, or as a cruciform tail.

Figure 2:
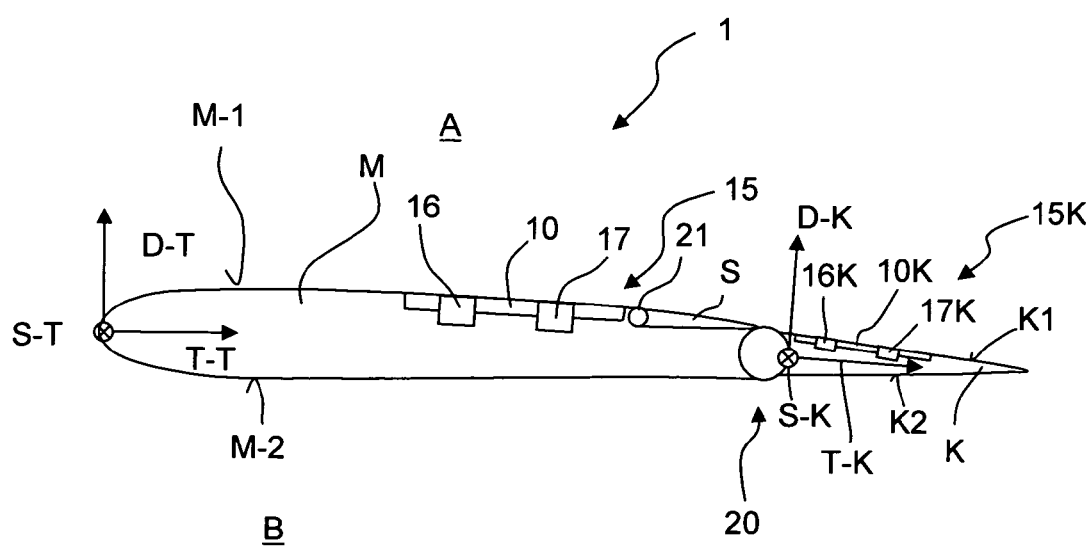
FIG. 2 a diagrammatic view of the cross section of an aerofoil with an arrangement, according to an embodiment of the invention provided in at least one segment of the aforesaid, of flow-influencing devices and of flow-state sensors as well as an optionally provided adjustable flap that can be adjusted by an adjustment device with an actuator.

In FIG. 1 a co-ordinate system KS-F related to the aircraft F is entered, including an aircraft longitudinal axis X-F, an aircraft transverse axis Y-F and an aircraft vertical axis Z-F. An aerofoil co-ordinate system KS-T with an axis S-T for the wingspan direction, an axis T-T for the depth direction and an axis D-T for the thickness direction of the aerofoil can be associated with each aerofoil 1a, 1b (FIG. 2). Furthermore, a flap co-ordinate system KS-K with an axis S-K for the wingspan direction of the flap, an axis T-K for the depth direction and an axis D-K for the thickness direction of the flap can be associated with each flap (FIG. 2).

FIG. 2 diagrammatically shows an aerofoil 1 including a main wing M and a control flap S, which is provided for controlling or manoeuvring the aircraft, as well as a high-lift flap K. In FIG. 2 the control flap S is shown as a spoiler, however, from the functional point of view according to various embodiments of the invention it could alternatively or additionally, for example, be an aileron or, if it is not arranged on the main wing, an elevator control surface 7 and/or rudder 9.

FIG. 2 shows in detail a main wing M with an adjustable flap K which is coupled to the main wing M. According to various embodiments of the invention, the aerodynamic body can be the adjustable flap K, in other words an aerodynamic body that is adjustably arranged on the aircraft and thus, for example an adjustable flap shown in FIG. 1, in other words for example a high-lift flap, an aileron, a spoiler, an elevator control surface or a rudder. The aerodynamic body provided according to various embodiments of the invention can, in particular, also be a main wing M. The main wing M at its top M-1 extending on the suction side A includes a bottom M-2, which extends on the pressure side B of the aforesaid, and possibly a rear face, which faces the high-lift flap K. For the high-lift flap or generally for the adjustable flap K or the aerodynamic body a flap depth direction T-K or generally a depth direction, a wingspan direction S-K or generally a wingspan direction, and a flap thickness direction D-K or generally a flap thickness direction has been defined. The adjustable flap K or high-lift flap includes a top K1 that extends on the suction side A of the high-lift flap K, and a bottom K2 that extends on the pressure side B of the high-lift flap K.

For further explanation of the invention, reference is made to the combination, diagrammatically shown in FIG. 2, of a main wing, at least one spoiler as a control flap and a high-lift flap as an adjustment flap. In this application the at least one control flap can, in particular, additionally include an aileron and/or the rudder. As an alternative or in addition to the high-lift flap as an adjustment flap the horizontal stabiliser and/or the vertical stabiliser and generally also an adjustment flap and generally an adjustable flap of the aircraft can be functionally included according to various embodiments of the invention.

Figure 3:
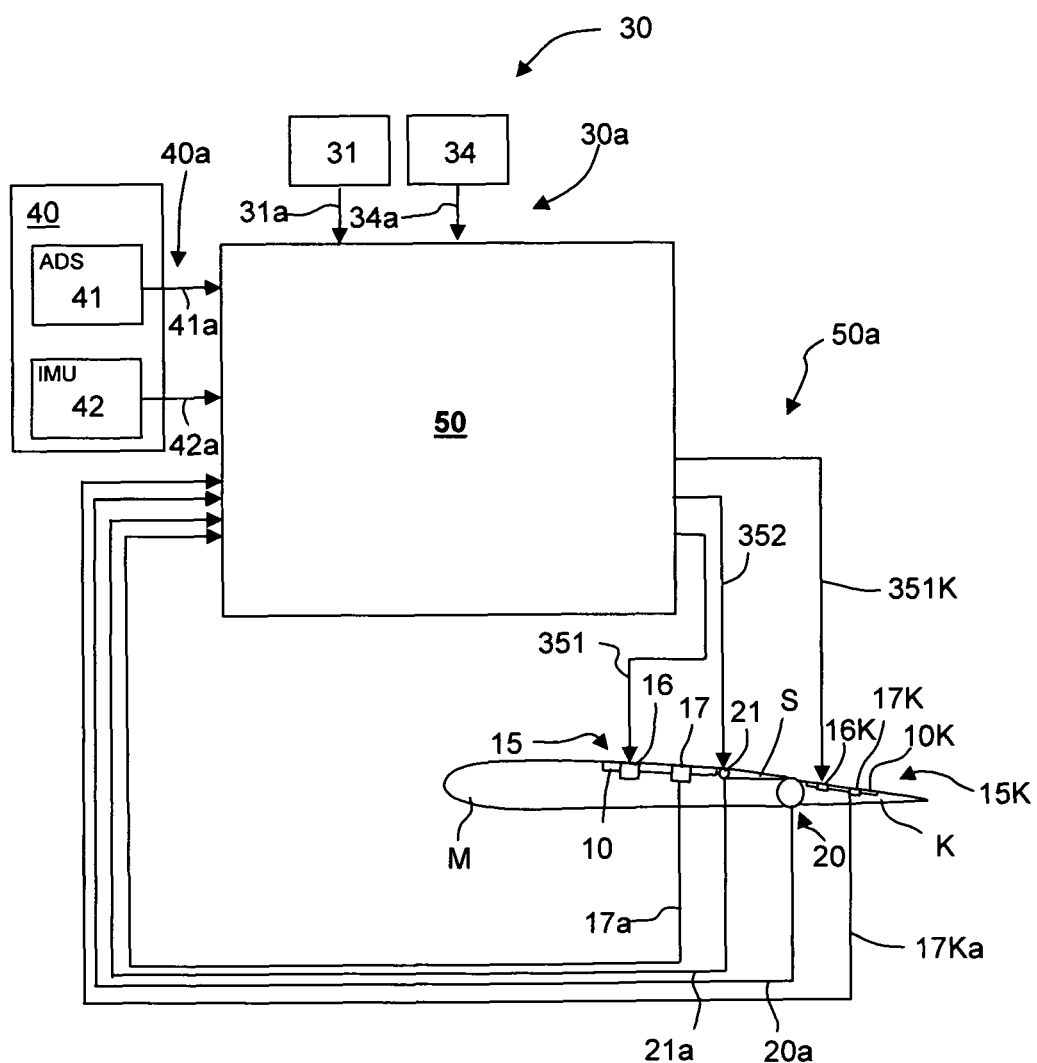
FIG. 3 an example embodiment of a flight controlling device, provided according to an embodiment of the invention, with a flight control device which, for example, is functionally connected to an actuator of a control flap and with two flow-influencing devices in each case of an arrangement distributed over a surface segment of a flow-influencing device and a flow-state sensor device, wherein the flow-state sensor device of each segment is functionally connected to the flight control device, and wherein in each case an arrangement distributed over a surface segment of a flow-influencing device and a flow-state sensor device is arranged at the top of the main wing and at the top of an adjustment flap.

According to various embodiments the invention, a flight control device 50 is provided that is designed in such a manner that it generates actuating commands for commanding the respective actuator 21 of a control flap S and/or the respective actuator 20 of an adjustable flap K such as the high-lift flap and of flow-influencing devices 15; 15K arranged on the aerofoil 1a, 1b, 1 and or on at least one adjustment flap, and transmits them to the aforesaid (FIG. 3). The flight control device 50 determines the then current actuating commands 50a on the basis of the desired commands 30a of the specifying device 30, the sensor signals 40a of the flight-state sensor device 40 and the sensor signals 17a, 17Ka of the flow-state sensor device 17 and 17K, respectively, and optionally the sensor signals of a sensor for acquiring the state of the control flap S and/or of the adjustable flap K. The state of the control flap S and/or the flap K can be one or more of the following parameters of the control flap S and the flap K, respectively: the position, the velocity, the acceleration and/or another state. The desired commands 30a as input signals of the flight control device 50 can include a desired acceleration and/or a desired direction of the aircraft. The flight control device 50 is designed in such a manner that it generates a then current input signal vector 50a for commanding the actuator 21 and the flow-influencing devices 15; 15K and transmits it to the aforesaid.

The flow-influencing devices 15; 15K, which are commanded by the flight control device 50 by means of the then current input signal vector 50a, can be arranged on the main wing M and/or on an adjustment flap K, wherein the flow-influencing device 15; 15K in each case of a surface segment includes at least one flow-influencing device and at least one flow-state sensor. According to FIG. 2, in a segment 10 at the top M-1 of the main wing and at a segment 10K at the top K1 of the adjustment flap K in each case an arrangement 15 or 15K including at least one flow-influencing device 16 or 16K and at least one flow-state sensor 17 or 17K is arranged. In FIG. 1 at the main wings of the aerofoils corresponding segments 11a, 11b, 12a, 12b are diagrammatically entered, in which in each case such an arrangement 15 including at least one flow-influencing device 16 and at least one flow-state sensor 17 is arranged. As shown in FIG. 2, as an alternative or in addition such a segment 10K including an arrangement 15K of at least one flow-influencing device 16K and at least one flow-state sensor device 17K can be arranged at the top K1 or at the bottom K2 of the respective adjustment flap K.

The flow-influencing device 15 or 15K is designed in such a manner that by means of it, on the basis of then current control signals or on the basis of a then current control signal vector 50a, the flow present at the respective surface, and thus the lift coefficient of the main wing M or of the adjustable flap K, can be influenced. In this arrangement the flight control device 50 includes a function which for the purpose of local lift coefficients on the aerofoil makes a selection, depending on the flight state, of the flow-influencing devices 15; 15K that are to be operated. In this arrangement the flight control device determines desired local flow-state values segment by segment; in other words the then current control signal vector 50a includes control signals for each of the controllable segments 10, 10K.

In this arrangement the control signal vector 50a can be such that it includes a value for all the flow-influencing devices 15; 15K that can be operated, wherein the flow-influencing devices 15; 15K, which on the basis of the selection and according to the respective then current control signals or then current control signal vector 50a are not to be operated, receive a setting value of zero.

In this arrangement the flight control device 50 can, in particular, be designed in such a manner that by means of a regulator model for the aircraft it generates then current control signals or a then current control signal vector 50a for commanding the actuator 21 of the at least one control flap S and of the flow-influencing devices 15; 15K and transmits them to the aforesaid, wherein the flight control device 50 determines the then current control signals or the then current input signal vector 50a on the basis of the desired commands 30a of the specifying device 30, the sensor signals 40a of the flight-state sensor device 40, and the sensor signals of the flow-state sensor device 17; 17K.

Figure 4:
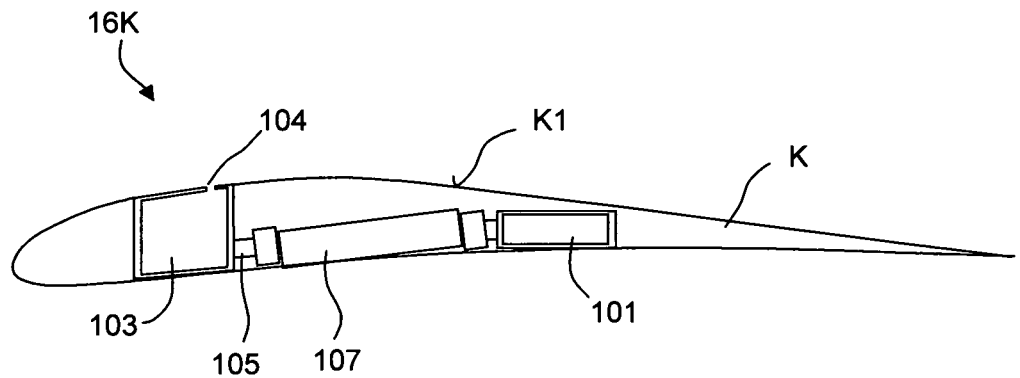
FIG. 4 a section view of an example embodiment of the flow-influencing device that is provided according to an embodiment of the invention, which flow-influencing device is, for example, installed in an adjustment flap.

FIG. 4 shows an example embodiment of the flow-influencing device 16, 16K, provided according to an embodiment of the invention, of a segment, with the example showing a flow-influencing device 16K of an adjustment flap K. In this arrangement the flow-influencing device 16K includes a pressure chamber 101 to receive compressed air, an outlet chamber or blow-out chamber 103 and one or several connecting lines 105 for connecting the pressure chamber 101 to the outlet chamber 103. The blow-out chamber 103 includes at least one outlet opening or blow-out opening and preferably an arrangement 110 of outlet openings or blow-out openings. Purely for illustration FIG. 4 shows a single blow-out opening 104. At least one valve device 107 is integrated in the at least one connecting line 105, which valve device 107 is functionally connected to the flight control device 50. The flight control device 50 controls the valve device 107 by means of the control signal vector 50a that is current at the time, in order to let compressed air present in the pressure chamber 101, corresponding to the setting values of the then current control signal vector 78, either not flow or flow at a corresponding speed and/or throughput into the outlet chamber 103, from which location the air exits through an arrangement 110 of blow-out openings in order to influence the flow around the surface K1 of the adjustment flap K.

Introducing compressed air into the pressure chamber 101 can take place in various ways. In this arrangement it can be provided for the compressed air to be taken from the outer flow in a stagnation point region at the surface of a aerodynamic body of the aircraft, and in particular in a stagnation point at the adjustment flap or in a stagnation point at the main wing. It is also possible for a pressure generating device or a pump or a flow variator to be connected to the pressure chamber, with said pressure generating device or pump taking up air by way of a supply line. The supply line can, in particular, emanate from an opening or an arrangement of openings at the top of the main wing M and/or of the flap K. In this arrangement said opening can be arranged in one location, or said arrangement of openings can be arranged so as to be distributed over a region of the main wing M and/or of the flap K, which region is provided in such a manner that at these positions suction removal effects occur that correlate in a predetermined manner with the blow-out effects generated at the arrangement 110 of blow-out openings.

Figure 5:
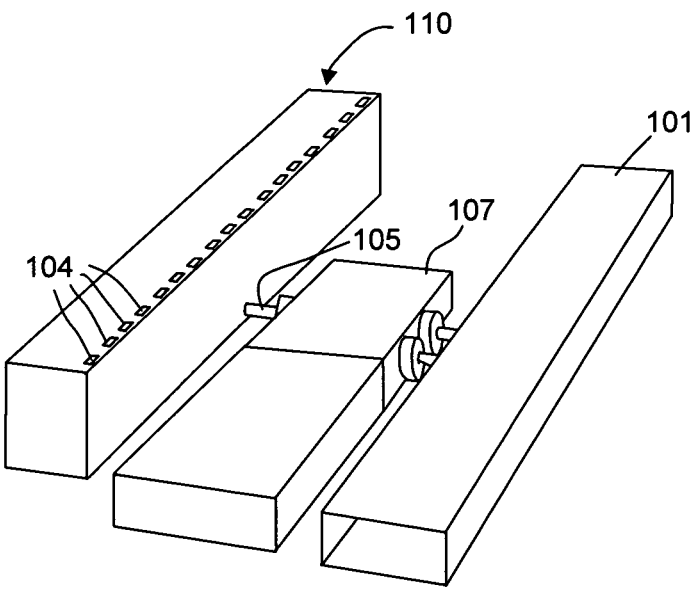
FIG. 5 a perspective diagrammatic view of the flow-influencing device shown in FIG. 4.
Figure 6:
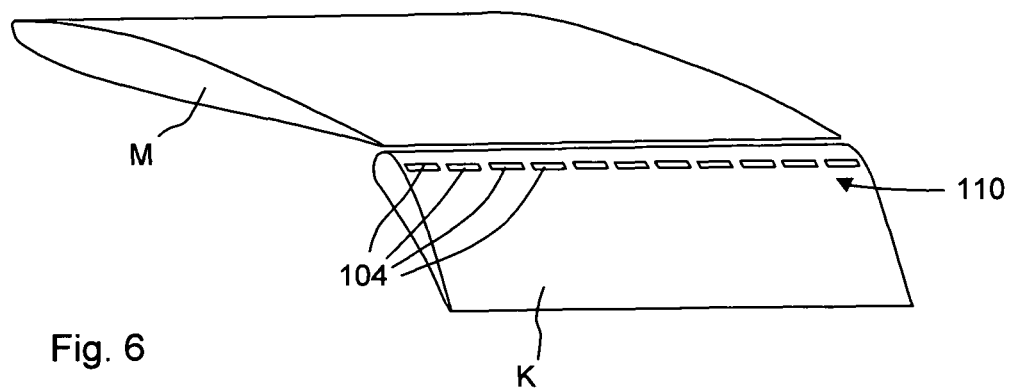
FIG. 6 a diagrammatic view of a wing with a main wing and an adjustment flap coupled thereto, in the form of a high-lift flap, at the top of which an arrangement, provided according to an embodiment of the invention, of blow-out openings of a flow-influencing device is arranged.

The flow-influencing device 16K, which in FIG. 4 is shown in its installed state, is diagrammatically shown in FIG. 5 as a structurally isolated device. FIG. 6 diagrammatically shows an aerofoil with a main wing M and an adjustment flap K, coupled thereto, in the form of a high-lift flap, at the top of which an arrangement 110 of blow-out openings provided according to an embodiment of the invention is arranged.

Figure 7:
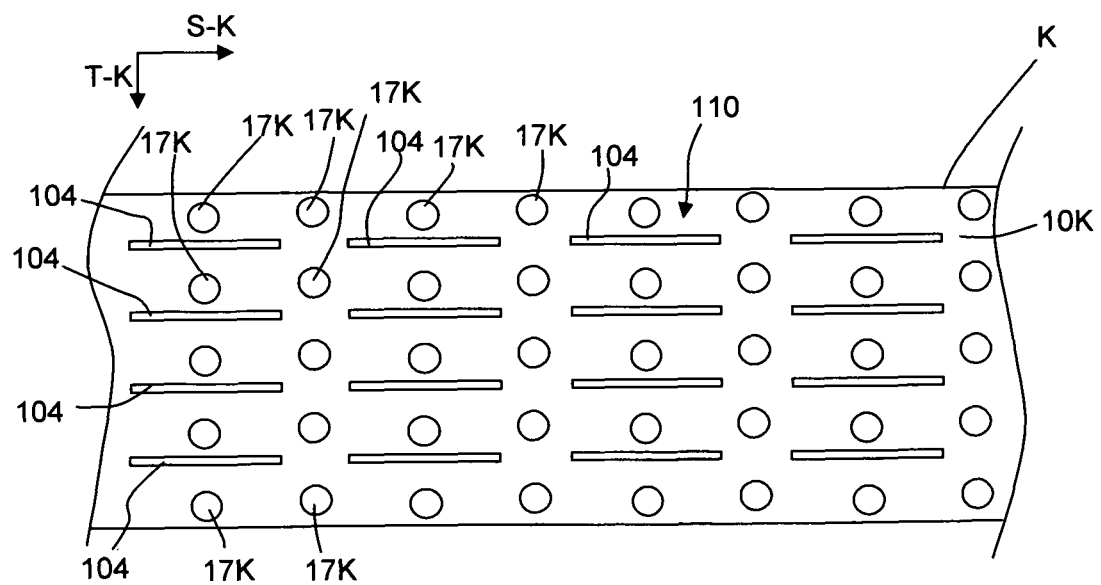
FIG. 7 a top view of a surface segment of an adjustment flap with an arrangement, implemented as an example, of flow-influencing devices and flow-state sensor devices.

The arrangement 110 of blow-out openings or the opening device preferably includes an arrangement of, in particular, slit-shaped openings (FIGS. 5 to 7). According to an embodiment of the invention it is preferably provided for the blow-out openings that fluidically are communicating with one or several blow-out chambers to be distributed over a surface segment of the flow body of the aircraft. In this arrangement, several surface segments can be arranged side by side or one behind the other when viewed in the direction of flow S in order to influence the flow over a larger region of the flow body. The flight control device 50 determines the actuating commands and corresponding setting values for each arrangement 15, 15K of flow-influencing devices 16 or 16K and flow-state sensor devices 17 or 17K of each controllable segment 10, 10K of segments 10, 10K that are distributed over the flow body, in other words for example over the main wing, at least one adjustment flap and/or control flap, with such arrangements 15, 15K of flow-influencing devices 16 or 16K and flow-state sensor devices 17 or 17K.

FIG. 8 shows, as an example, a top view of a surface segment 10K with an arrangement 15K of flow-influencing devices and flow-state sensor devices as they can, according to various embodiments of the invention, generally be arranged in a surface segment of the main wing or of an adjustment flap and generally of a flow body of the aircraft F. The arrangement shown in FIG. 7 includes an arrangement 110 of blow-out openings 104 that are distributed in a matrix-like manner over the surface segment 10K. Generally speaking, the blow-out openings 104 of the arrangement 110 of outlet openings are distributed over the respective surface segment in order to influence the flow around or above the entire region of the surface segment 10 or 10K. Preferably, a pressure chamber and a valve device 107 is associated with the openings 104 of a surface segment 10, 10K. As an alternative it can also be provided for a pressure chamber 101 to be associated with several surface segments 10, 10K.

The blow-out openings 104 include a shape which is optimal for influencing the flow around the respective surface segment 10, 10K. In this arrangement it can be provided for various forms of blow-out openings 104 to be used within a surface segment 10, 10K. For example, the blow-out openings 104 can also be designed in an ellipsoid or crescent shape.

Furthermore, within a surface segment a plural number of flow-state sensor devices 17 or 17K are arranged, which in FIG. 8 are diagrammatically shown as circular icons. All the flow-state sensor devices 17 or 17K are functionally coupled to the flight control device 50 (FIG. 3) for transmitting current flow states at the position of the respective flow-state sensor device 17 or 17K in the form of the sensor signals in each case generated by each flow-state sensor device 17 or 17K. On the basis of the measured flow states, in the flight control device 50 a determination is made in relation to each segment, at which blow-out openings 104 air is to be blown out and at what intensity, in order to adjust a flight state for the aircraft, which flight state corresponds to the desired commands generated by the specifying device 30 for generating flight states of the aircraft. In this arrangement the flight control device 50 at the same time determines desired commands for the actuator drive of the control surfaces S.

Various surface segments can be arranged on the surface of the flow body, in other words for example of the main wing and/or of the adjustment flap K, either side by side or overlapping each other.

Furthermore, it can be provided for the flight control device 50 to use flow states that are determined by means of flow-state sensor devices 17, 17K which are arranged in further surface segments 10, 10K for determining actuating commands of flow-influencing devices 16, 16K.

On the basis of the corresponding function of the flight control device 50 the latter, by commanding the flow-influencing devices 16 or 16K of one or several surface segments 10, 10K in particular also sets the extent to which the flow present on the respective surface segment 10, 10K can be influenced. To this effect, corresponding values of the then current control signal vector 70a are determined. In this arrangement the flight control device 50 controls the valve device or devices 107 of several surface segments 10, 10K. In this arrangement, in particular, pulsed blowing-out can be provided for.

As an alternative or in addition, it can be provided for the flight control device 50 to control an opening device on the respective blow-out openings 104 in order to, by opening and closing the aforesaid, set the blow-out flow at the respective blow-out opening 104.

In addition it can be provided for the flight control device 50 to be functionally coupled to a pressure generating device or flow assistance drive (not shown), which is coupled to the pressure chamber, in order to, by means of corresponding control or commanding of the pressure generating device or flow assistance drive, respectively, to set the pressure in the pressure chamber and in this manner to set the blow-out speed at the openings 104 of a surface segment 10, 10K. In this arrangement it can, in particular, be provided for the pressure in the pressure chamber to be set on the basis of the flight state and in particular on the basis of the flight speeds and the flight altitude or variables derived therefrom. Furthermore, it can be provided for the flight control device 50 in particular flight state regions, for example during cruising, to deactivate the pressure generating device. Generally speaking, the pressure generating device can also operate at a fixed, set performance, or said pressure generating device can be designed in such a manner that with it, based on corresponding control by means of a control function, the inlet pressure and/or the blow-out pressure and/or the differential pressure are varied or controlled.

In this arrangement the flow assistance drive can be installed or integrated in a channel connected to the opening.

The flow-state sensor devices 17, 17K can generally be designed from a sensor for acquiring the characteristics of the flow state at the top of the main wing M or of the flap K, which sensor is designed in such a manner that by means of the signal generated by the sensor the flow state can unequivocally be determined, in other words it can be determined whether an attached or detached flow is present.

Various embodiments of the invention provides for an aircraft with a flight controlling device with an actuating device or control input device 31, connected to the flight control device, for generating desired control commands 31a for controlling the aircraft F. The control input device 31 of the aircraft F usually includes a control input device 31, arranged in the cockpit of the aircraft, for entering control inputs for controlling the flight path of the aircraft, which control input device 31 can, in particular, include the pilot input means such as a joystick and optionally also pedals.

Furthermore, the flight controlling device can include an operating-mode input device and/or an autopilot 34, which generates desired autopilot commands 34a for controlling the aircraft F, and which functionally communicates with the flight control device 50 in order to send the desired commands 31a or 34a to said flight control device 50.

At least one actuator drive and/or a drive device are/is associated with the control flaps, for example the ailerons 5a, 5b, the spoilers 2a or 2b, that in each case are present on the aircraft, which actuator drive and/or drive device in each case according to various embodiments of the invention are/is optionally controlled by the flight controlling device 50 by means of command signals that are desired commands, in order to adjust the respectively associated control flaps for controlling the aircraft F. In this arrangement it can be provided for one of these control flaps, that this flap can be adjusted by means of the operation of an actuator drive, or, in order to increase failsafe operation of the aircraft system, by means of the operation of a plural number of actuator drives.

On the basis of desired control commands 31a of the control input device 31 and/or the desired autopilot commands 34a of the autopilot 34, in the flight control device 50 desired commands are generated for operating or moving actuator drives of the control flaps S, 2a, 2b, 5a, 5b, and in particular the actuator for adjusting the flow-influencing devices 16, 16K and/or the actuator or the flap drive of the adjustment flaps K to be controlled, and are sent to the aforesaid. The actuator for adjusting the flow-influencing devices 16, 16K can, in particular, be the associated valve device and/or the respectively associated pressure generating device or the associated flow assistance drive.

The aircraft F further includes a flight-state sensor device 40, which is functionally connected to the flight control device 50, including an air-data sensor device 41 or air data system (ADS), for the acquisition of flight states for determining the flight state, as well as a flight-position sensor device or an inertial sensor device 42 or inertial measurement unit (IMU) for acquiring a flight state of the aircraft F and in particular the rotation rates of the aircraft F. The air-data sensor device 41 includes air data sensors for determining the flight state of the aircraft F and in particular the dynamic pressure, the static pressure and the temperature of the air flowing around the aircraft F. By means of the flight-position sensor device 42, in particular rotation rates of the aircraft F, including the yaw rates and the roll rates of the aircraft, are acquired in order to determine the flight position of said aircraft. The flight controlling device 50 receives the flight-state sensor signals 40a of the sensor values acquired by the flight-state sensor device 40, and in particular of the air-data sensor signals 41a of the air-data sensor device 41 and the flight-position sensor data 42a from the flight-position sensor device 42.

The flight controlling device 50 in the form of a flight-state regulating device 70 (FIG. 3) includes a control function which from the control input device 30 receives control commands and from the sensor device 40 receives sensor values 40a. The control function is designed in such a manner that depending on the control commands 30a and the acquired and received sensor values 40a it generates actuating commands for the actuator drives and transmits them to the aforesaid so that, by actuating the actuator drives, control of the aircraft F according to the control commands takes place. As described, FIG. 3 shows an embodiment of the invention in which on the main wing M and the adjustable flap K at one position in the respective wingspan direction in each case an arrangement 15 or 15K of flow-influencing devices 16 or 16K and of flow-state sensors 17 or 17K is arranged.

During flight, by means of an actuating device 31 the pilot generates a desired command 31a for controlling the aircraft. The desired command 31a for controlling the aircraft can, for example, be a three-dimensional acceleration vector for the relative change of the flight state of the aircraft, or it can be specifications relating to a change in direction. Furthermore, the desired-command vector can be a composition of both specified values and in this arrangement, for example, can generate specifications relating to a change in direction for lateral movement, and acceleration specifications relating to the vertical movement of the aircraft. In addition it can be provided for the desired command or desired-command vectors 34a to be generated by means of an autopilot 34.

As shown in FIG. 3, according to an embodiment of the invention the flow-influencing specifying device 30 controls the flight control device 50, which subsequently on the basis of sensor values generates actuating commands or control signals, in particular in form of a signal vector or at least one respective signal vector 50a, in particular in the form of a control signal vector 50a an transmits the commands at least to one such actuator drive, which in one segment 10 or 10K on a surface of the aerofoil, and optionally as an alternative or in addition, is arranged on any existing at least one adjustment flap K that can be controlled by the aforesaid, and controls an actuator drive 21 of the control flaps S. On the basis of desired commands 30a of the specifying device 30, in other words flow-state actuating commands 351 or 351K for operating or moving at least one actuator or actuator drive of the flow-influencing device 15 or 15K of each affected segment 10 or 10K for adjusting the flow-influencing devices and also actuating commands 352 for actuating or moving at least one actuator or the flap drive 21 of the control flaps 21 to be controlled are generated by the flight control device 50 and are transmitted to the aforesaid.

Furthermore, it can be provided for the flight control device 50, on the basis of corresponding inputs to the specifying device 31 and desired commands 31a generated therefrom, to generate actuating commands (not shown) for adjusting the adjustment flap K and to transmit them to an actuator drive for adjusting the aforesaid. Furthermore, it can be provided for the flight control device 50 to generate such actuating commands for adjusting the adjustment flap K on the basis of flight state data. In this arrangement it can, furthermore, be provided for the flow-state actuating commands 351 or 351K to be determined depending on the actuating commands for adjusting the adjustment flap K as well as depending on the actuating commands 352 for adjusting the control flap S. As an alternative, in the then current control signals or current control signal vector 50a generated in each case by the flight control device 50, the actuating commands for commanding the actuator 21 of the at least one control flap S and of the flow-influencing devices 16; 16K and optionally of the adjustment flaps K and the information as to which one of the flow influencing devices are to be operated at a particular point in time are contained.

By operating or moving the actuator drives of the flow-influencing devices, in a predetermined manner the local lift coefficients or the ratios of drag coefficient to lift coefficient in that wingspan region are altered in which the segment 10 or 10K with the respectively controlled flow-influencing device is situated. In the case of the presence of several segments 10, 10K arranged in the wingspan direction and/or in the depth direction of the main wing or of the flap K, it can be provided for the flow-state actuating commands 351 or 351K to be calibrated with and consolidated with the flow-influencing devices of the respective segments by means of a segment control function, or in each case a higher-level actuating command.

For example, in the case in which each aerofoil 1a, 1b includes two segments 10, each including an arrangement 15 or 15K of flow-influencing devices 16 or 16K and of flow-state sensors 22 or 22K and two adjustable flaps K that in a functionally predetermined manner are provided for stabilising and/or controlling the aircraft, and/or setting a flight operation mode, the flow-influencing specifying device 30 and consequently the flight control device 50, on the basis of the control algorithms and regulating algorithms implemented therein, in a time-dependent manner controls said flow-influencing devices and flap drives of the control flaps for the purpose of adjusting the aforesaid, in order to set a flight state corresponding to the desired commands 31a and/or 32a for controlling the aircraft F or a flight mode, and in so doing to stabilise the aircraft in a flight position, and/or carry out a path control movement and/or set the load distribution of the aerofoil, and/or compensate for wind gusts.

The aerofoil used according to various embodiments of the invention can also be designed in such a manner that it does not include an adjustable flap that for the purpose of control or stabilisation of the aircraft is functionally connected to the flow-influencing specifying device 30 or the flight control device 50. In this case the flow-influencing specifying device 30 or the flight control device 50 controls flow-influencing devices 16 of at least one aerofoil segment 10. In an analogous manner according to various embodiments of the invention it can be provided that on the surface of at least one adjustable flap, segment by segment, an arrangement 15K of flow-influencing devices 16K and of flow-state sensors 17K is present which in the prescribed manner for the purpose of controlling or stabilising the aircraft is functionally connected to the flow-influencing specifying device 30 or the flight control device 50.

The control device according to various embodiments of the invention thus generally includes a flow-influencing specifying device 30 with a control function for generating desired commands to drive devices for the purpose of adjusting flow-influencing devices 16 or 16K of the at least one surface segment 10 or 10K and/or desired commands to drive devices for the purpose of adjusting at least one adjustable flap for each aerofoil, which control device on the basis of desired commands for controlling the aircraft determines corresponding desired commands for actuating actuating devices on the wings, by means of whose activation the flight state of the aircraft is altered or influenced according to the desired commands.

In this arrangement it can be provided for an input value that has been derived from the desired command 30a of the flow-influencing specifying device 30 to be fed to the flow-influencing device 16, 16K as an input value which is determined by means of:
  a flight control device 50 on the basis of flight-state sensor data and of flow-state sensor data, or
  a flight-state regulating device 70 on the basis of flight-state sensor data from the desired command 30a (reference character 66 in the example embodiment of FIG. 3).

Controlling and operating the at least one actuator of the flow-influencing devices 16 or 16K in each case of a segment 10 or 10K can, in particular, take place on the basis of desired commands 30a of a flow-influencing specifying device 30 that are transmitted to a flow-state regulating device which from the desired commands 30a in each case for each segment 10 or 10K of the at least one segment 10 or 10K generates a flow-state controller variable for the actuator of the flow-influencing device 16 or 16K of a wing, which flow-state controller variable corresponds to a local lift coefficient, required at a point in time, for the region of the respective segment. On the basis of the control and command of the actuator in each case of each segment by means of the flow-state controller set variable, the respectively controlled actuator is operated, as a result of which the respectively associated flow-influencing device 16 or 16K influences the flow state in the respective segment of the aerofoil and in so doing, in particular, influences and varies the flow state present at the respective segment 10 or 10K.

In the example embodiment shown in FIG. 3, for the purpose of receiving flight-state sensor signals 40a, the flight control device 50 communicates with a flight-state sensor device 40.

In this arrangement the flight control device 50, in particular in the example embodiment of FIG. 3, can include a regulating algorithm that corrects the above-mentioned input values according to the desired commands 30a received by the aforesaid ("complete control").

The regulating algorithm of the flight control device 50 and/or of the flow-state regulating device 60 can on the one hand provide a synthesis of a measure relating to lift, drag or lift-to-drag ratio including sensor data (in particular pressure sensors as a sensor device 17 on the aerofoil or the flap K) and on the other hand by designed by a robust regulating algorithm for reaching a specified target value for the above measure. The regulator is supported by an anti-wind-up reset structure. The measure is obtained from a combination of temporal integration and a reference table; it can unequivocally be connected to a flight-relevant variable, for example the lift. Indirectly, in this manner it is possible, for example, to specify a lift or lift coefficient, which then by means of the algorithm is converted to a specification relating to the numerical measure. This specification relating to the numerical measure, hereinafter referred to as the "desired value", is used in order to determine the difference from the then current numerical value which then determines the intensity and type of the regulating intervention.

The regulator can have been designed on the basis of a linear multivariable black-box model with a method for synthesising robust regulators. In the identification of the linear multivariable black-box model, suitable interference signals in the form of sudden changes in the actuation variable are generated and the reaction of the numerical measure to the aforesaid is measured. From the dynamic behaviour of the reaction, a linear differential-equation system is obtained by means of parameter identification methods, which linear differential-equation system provides the basis for regulator synthesis. Many different instances of such identification provide a model family from which for each synthesis a representative or average model is selected. Various methods (for example $H_\infty$-synthesis, robustification, robust loop shaping) can be used in regulator synthesis. The resulting classical linear regulating loop can be supported by an anti-wind-up reset structure, which in the case of a request for a controller variable that exceeds the realisable controller variable corrects the internal states of the regulator in such a manner that an integration component in the regulator does not result in overshooting or locking the regulator. Thus even in the case of unrealistic requirements the regulator remains responsive, which increases operational safety. The regulator is always adjusted to the then current situation, without experiencing delays caused by previous limitations of the controller variable.

The regulator can, in particular, be designed as an optimum regulator that receives all the necessary input variables as regulating variables, and according to a regulating method algorithm in a matrix-like process generates the various output signals for the flow-influencing device 16 or 16K and/or the actuator 21 or flap drive of the at least one selected adjustable flap K, on the basis of calibrations and parameters derived therefrom for the allocation of regulating variables and controller variables depending on flight state variables.

According to various embodiments of the invention, thus a flight-relevant characteristic (lift, lift coefficient, drag, lift-to-drag ratio etc.) can be determined in a non-stationary manner from substitute regulating variables; this characteristic can then be used for a desired value comparison; and finally in this manner principally any value can be set for the respective characteristic, within the framework of physics, and by means of linear, robust regulating algorithms designed for a linear model can be achieved.

In this arrangement, as a result of doing away with heavy movable components, the regulating system is significantly faster when compared to those based on conventional mechanical solutions so that local flow phenomena can be suppressed or used in a targeted manner.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An aircraft with aerofoils comprising a main wing and at least one control flap that is arranged so as to be adjustable relative to the main wing, and comprising at least one adjustment flap, with the aircraft comprising:

an actuator for operating the at least one control flap, as well as a sensor device for acquiring a set position of the control flap, at least one arrangement of flow-influencing devices, which extends in at least one surface segment of the main wing, wherein the surface segment extends in a wingspan direction, and/or of at least one adjustment flap of each said aerofoil, for influencing a fluid that flows over the surface segment, and wherein one or more outlet openings are provided over portions of the surface segment for ingesting and/or blowing out the fluid, at least one arrangement of flow-state sensor devices for measuring a flow state on a respective surface segment, wherein the aircraft further comprises:

a flight control device which on an input side is functionally connected to the sensor device for acquiring the set position of the control flap and to the flow-state sensor devices and the flight control device for transmitting actuating commands on an output side is functionally connected to the actuator and the flow-influencing devices, a flight-state sensor device for acquiring flight states of the aircraft, wherein the flight-state sensor device is functionally connected to the flight control device for transmitting the flight states, and a specifying device for generating desired commands, which correspond to the flight states of the aircraft, the specifying device being functionally connected to the flight control device for transmitting the commands as input signals of the flight control device, wherein the flight control device comprises a function for optimizing local lift coefficients on the aerofoil depending on the respective acquired flight state carries out a selection of the flow-influencing devices that are to be operated, wherein the flow-influencing device of the main wing or of the adjustment flap comprises:

a pressure chamber, arranged in the main wing and/or in the adjustment flap, for receiving compressed air;

an outlet chamber with the outlet openings arranged on the surface of the main wing and/or on the adjustment flap, one or several connecting lines for connecting the pressure chamber to the outlet chamber; and at least one valve device integrated in the connecting line, wherein the valve device functionally communicates with the flight control device, wherein the flight control device controls the valve device by current control signals in order to let compressed air present in the pressure chamber either not flow or flow at a corresponding speed through the outlet openings according to the actuating values of the then current control signals in order to influence the flow around the surface of the main wing or of the adjustment flap.

2. The aircraft according to claim 1, wherein the flight control device generates the current input signals for commanding the actuator of the at least one control flap and of the flow-influencing devices using a mathematical model of the aircraft, and transmits the respective control signals to the actuator and the flow-influencing devices, wherein the flight control device determines the then current input signals on the basis of the desired command of the specifying device, the sensor signals of the flight-state sensor device and the sensor signals of the flow-state sensor device.

3. The aircraft according to claim 1, wherein the adjustment flap is a high-lift flap arranged on the aerofoil of the aircraft, wherein the at least one arrangement of flow-influencing devices and/or the at least one arrangement of flow-state sensor devices is arranged on the high-lift flap and/or on the main wing.

4. The aircraft according to claim 1, wherein the desired commands as the input signals of the flight control device comprise a desired acceleration and/or a desired direction of the aircraft.

5. The aircraft according to claim 1, wherein the specifying device comprises a control input device for generating the desired commands upon activation.

6. The aircraft according to claim 5, wherein the specifying device comprises an autopilot device which on the basis of a specified operating mode generates the desired commands for controlling a path of the aircraft on a specified desired path.

7. The aircraft according to claim 1, wherein the flight control device comprises a segment control function that is designed in such a manner that it generates actuating commands to the flow-influencing device of each of the segments and/or the actuating commands to the actuator on the basis of the control signals of the flight control device by optimization, taking into account the output and/or dynamics, available at a current point in time, of the flow-influencing device and/or of the actuator of the adjustable flap.

8. The aircraft according to claim 1, wherein the at least one surface segment comprises several segments that are arranged one behind the other when viewed in the wingspan direction of the wing.

* * * * *